United States Patent

Eckstein et al.

Patent Number: 5,233,048
Date of Patent: Aug. 3, 1993

[54] TRIARYLMETHANE COLOR FORMERS

[75] Inventors: Udo Eckstein, Cologne; Roderich Raue, Leverkusen, both of Fed. Rep. of Germany

[73] Assignee: Bayer Aktiengesellschaft, Leverkusen, Fed. Rep. of Germany

[21] Appl. No.: 942,112

[22] Filed: Sep. 8, 1992

Related U.S. Application Data

[63] Continuation of Ser. No. 627,063, Dec. 13, 1990, abandoned.

[30] Foreign Application Priority Data

Dec. 21, 1989 [DE] Fed. Rep. of Germany ....... 3942227

[51] Int. Cl.$^5$ ............... C07D 233/62; C07D 233/61; C07D 249/08
[52] U.S. Cl. ............................ 548/345.1; 546/229; 548/266.4; 548/267.2; 548/341.1; 548/341.5; 552/104
[58] Field of Search ............. 548/266.4, 267.2, 341.1, 548/341.5, 345.1; 546/229; 552/104

[56] References Cited

U.S. PATENT DOCUMENTS

| 3,897,438 | 7/1975 | Draber et al. ................ 548/214 |
| 4,897,223 | 1/1990 | Eckstein et al. ............... 546/229 |

FOREIGN PATENT DOCUMENTS

| 0234394 | 9/1987 | European Pat. Off. . |
| 0303942 | 2/1989 | European Pat. Off. . |
| 0330040 | 8/1989 | European Pat. Off. . |
| 1940628 | 8/1969 | Fed. Rep. of Germany ...... 548/344 |
| 644598  | 8/1984 | Switzerland . |

Primary Examiner—José G. Dees
Assistant Examiner—B. Frazier
Attorney, Agent, or Firm—Sprung Horn Kramer & Woods

[57] ABSTRACT

Color formers of the general formula

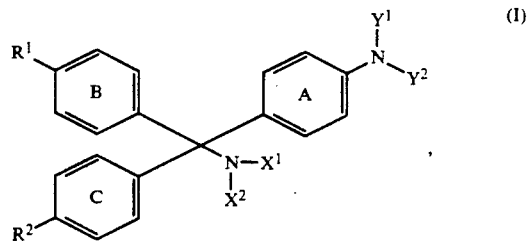

in which —independently of one another—
$R^1$ and $R^2$ are hydrogen, halogen, alkyl, aralkyl etc.,
$Y^1$ and $Y^2$ are alkyl, aryl, cycloalkyl or aralkyl,
$X^1$ is alkyl, alkenyl, cycloalkyl, aralkyl etc.,
$X^2$ is H, alkyl, alkenyl, cycloalkyl etc.
$X^1$ with $X^2$ with the inclusion of the nitrogen atom carrying them can form a saturated or unsaturated 5- or 6-membered heterocyclic ring, and
further isocyclic or heterocyclic rings can be fused with the rings A, B and C, upon incorporation in recording materials based on acid developers, show a particularly advantageous migration behaviour. Deep blue, green-blue, green, violet or red shades which have excellent sublimation and light fastness are obtained.

5 Claims, No Drawings

TRIARYLMETHANE COLOR FORMERS

This application is a continuation, of application Ser. No. 627,063, filed Dec. 13, 1990, now abandoned.

The invention relates to colour formers of the general formula

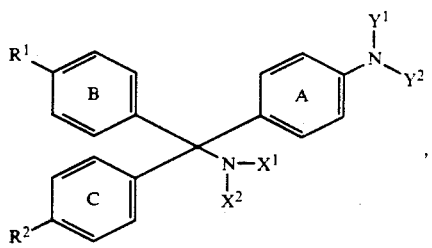

in which—independently of one another are—$R^1$ and $R^2$ are hydrogen, halogen, alkyl, aralkyl, alkoxy, aralkoxy, aryloxy or a radical of the formula

$Y^1$ and $Y^2$ are alkyl, aryl, cycloalkyl or aralkyl, $X^1$ is alkyl, alkenyl, cycloalkyl, aralkyl, aryl, acyl, arylcarbonyl, arylsulphonyl, carbamoyl, N-alkylcarbamoyl, N,N-dialkylcarbamoyl, N-arylcarbamoyl, N-alkyl-N-arylcarbamoyl, sulphamoyl, N-alkylsulphamoyl, N,N-dialkylsulphamoyl, N-arylsulphamoyl or N-alkyl-N-arylsulphamoyl, $X^2$ is hydrogen, alkyl, alkenyl, cycloalkyl, aralkyl or aryl, or $X^1$ with $X^2$ with the inclusion of the nitrogen atom carrying them can form a saturated or unsaturated 5- or 6-membered heterocyclic ring, and further isocyclic or heterocyclic rings can be fused with rings A, B and C, and the cyclic and acyclic radicals and rings A, B and C can carry further nonionic substituents customary in dyestuff chemistry, or mixtures thereof, their preparation and their use for the production of pressure-sensitive and thermo-reactive recording materials and to the preparation of their highly concentrated solutions in organic solvents from the group comprising chlorinated or unchlorinated hydrocarbons, vegetable oils or phthalic esters and to the use of these solutions for the production of pressure-sensitive recording materials.

Examples of nonionic substituents customary in dyestuff chemistry are halogen, hydroxyl, alkoxy, alkenyloxy, aryloxy, aralkoxy, cycloalkyloxy, alkylcarbonyloxy, arylcarbonyloxy, aryl, alkylmercapto, arylmercapto, aralkylmercapto, alkylsulphonyl, cyano, carbamoyl, alkoxycarbonyl, amino, which can be substituted by 1 or 2 alkyl, cycloalkyl, aryl or aralkyl groups, or the substituents of which can be ring-closed, preferably to form a 5- or 6-membered ring, acylamino and, as substituents of the rings, furthermore alkyl, aryl, aralkyl, alkenyl or arylvinyl.

Alkyl represents $C_1-C_{30}$-alkyl, in particular $C_1-C_{12}$-alkyl.

The alkyl radicals and the alkyl radicals in alkoxy, alkylthio, alkylamino, alkanoylamino, alkylsulphonyl and alkoxycarbonyl groups can be branched and be substituted, for example, by fluorine, chlorine, $C_1-C_4$-alkoxy, cyano or $C_1-C_4$-alkoxycarbonyl.

Aralkyl is in particular phenyl-$C_1-C_4$-alkyl, which can be substituted in the phenyl ring by halogen, $C_1-C_4$-alkyl and/or $C_1-C_4$-alkoxy.

Cycloalkyl is in particular unsubstituted or methyl-substituted cyclopentyl or cyclohexyl.

Alkenyl is in particular $C_2-C_5$-alkenyl, which can be monosubstituted by hydroxyl, $C_1-C_4$-alkoxycarbonyl, chlorine or bromine. Vinyl and allyl are preferred.

Halogen is in particular fluorine, chlorine and bromine, preferably chlorine.

Aryl is in particular phenyl or naphthyl which is unsubstituted or substituted by 1 to 3 $C_1-C_4$-alkyl, chlorine, bromine, cyano, $C_1-C_4$-alkoxycarbonyl or $C_1-C_4$-alkoxy.

Alkoxy is in particular unsubstituted or chlorine- or $C_1-C_4$-alkoxy-substituted $C_1-C_{12}$-alkoxy.

Acyl is in particular $C_1-C_4$-alkylcarbonyl, $C_1-C_4$-alkylsulphonyl, $C_1-C_4$-alkoxycarbonyl and $C_1-C_4$-alkoxysulphonyl.

Alkoxycarbonyl is in particular $C_1-C_4$-alkoxycarbonyl which is unsubstituted or substituted by hydroxyl, halogen or cyano.

The rings can be substituted by nonionic substituents, in particular by $C_1-C_4$-alkyl, $C_1-C_4$-alkoxy, cyano, nitro or halogen.

Of the colour formers of the formula (I), the colour formers of the formula

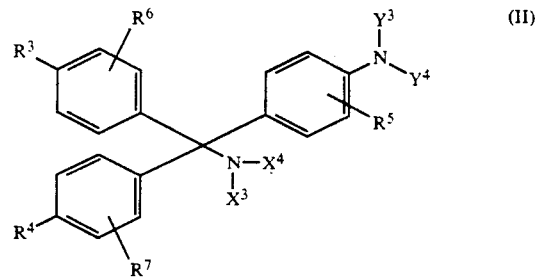

are of particular importance, in which—independently of one another—

$R^3$ and $R^4$ are hydrogen, chlorine, $C_1-C_{12}$-alkyl which is unsubstituted or substituted by chlorine or $C_1-C_4$-alkoxy, $C_1-C_{12}$-alkoxy which is unsubstituted or substituted by chlorine or $C_1-C_4$-alkoxy, benzyl, phenoxy or a radical of the formula

$R^5$, $R^6$, $R^7$ are hydrogen, chlorine, $C_1-C_{12}$-alkyl, $C_1-C_{12}$-alkoxy, phenoxy, benzyloxy or a radical of the formula

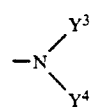

$Y^3$ and $Y^4$ are $C_1-C_{12}$-alkyl which is unsubstituted or substituted by chlorine, cyano, $C_1-C_4$-alkoxycarbonyl or $C_1-C_4$-alkoxy, cyclohexyl, phenyl or benzyl, which can be substituted by chlorine, $C_1-C_{12}$-alkyl or $C_1-C_{12}$-alkoxy, $X^3$ is $C_1-C_{12}$-alkyl, cyclohexyl, benzyl or phenyl which is unsubstituted or substituted by chlorine, $C_1-C_4$-alkyl or $C_1-C_4$-alkoxy, $C_1-C_4$-alkylcarbonyl, $C_1-C_4$-alkylsulphonyl, $C_1-C_4$-alkoxycarbonyl, phenylcarbonyl or phenylsulphonyl which is unsubstituted or substituted by chlorine, $C_1-C_4$-alkyl or $C_1-C_4$-alkoxy, carbamoyl, N-$C_1-C_4$-alkylcarbamoyl N,N-di-$C_1-C_4$-alkylcarbamoyl, N-phenylcarbamoyl or N-$C_1-C_4$-alkyl-N-phenylcarbamoyl, which is unsubstituted or substituted by chlorine, $C_1-C_4$-alkyl or $C_1-C_4$-alkoxy, or is sulphamoyl, N-$C_1-C_4$-alkylsulphamoyl, N,N-di-$C_1-C_4$-alkylsulphamoyl or N-phenylsulphamoyl which is unsubstituted or substituted by chlorine, $C_1-C_4$-alkyl or $C_1-C_4$-alkoxy, $X^4$ is hydrogen or $X^3$ with $X^4$ with the inclusion of the nitrogen atom carrying them can form a heterocyclic ring of the following formulae

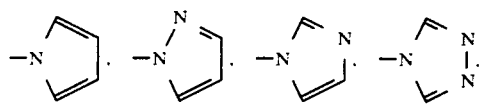

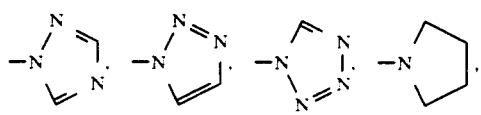

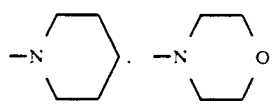

it being possible for the heterocyclic ring moiety to carry 1 to 3 radicals from the group comprising chlorine, $C_1-C_4$-alkyl or phenyl, and $R^3$ with $R^6$, $R^4$ with $R^7$ with the inclusion of the benzene ring carrying them can form a ring system of the formulae

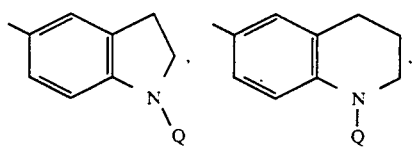

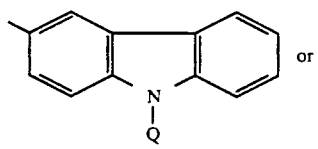

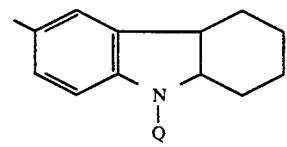

in which

Q represents $C_1-C_{12}$-alkyl, which can be substituted by chlorine, cyano, $C_1-C_4$-alkoxycarbonyl or $C_1-C_4$-alkoxy, cyclohexyl, phenyl or benzyl, which can be substituted by chlorine, $C_1-C_{12}$-alkyl or $C_1-C_{12}$-alkoxy, and the saturated ring moiety can carry up to four radicals from the group comprising chlorine, $C_1-C_4$-alkyl, $C_1-C_4$-alkoxy or phenyl, or

an unsubstituted or chlorine-, $C_1-C_4$-alkyl- or phenyl-substituted pyrrolo, pyrrolidino, piperidino, pipecolino, morpholino, pyrazolo or pyrazoline radical.

Examples of radicals substituted in the saturated ring are:

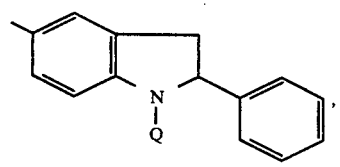

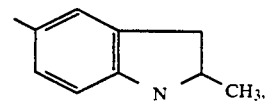

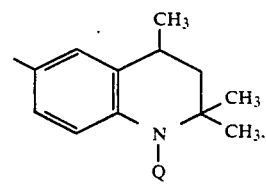

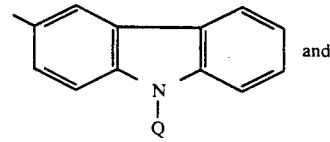

and

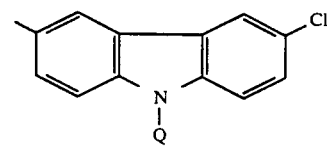

The colour formers of the formula

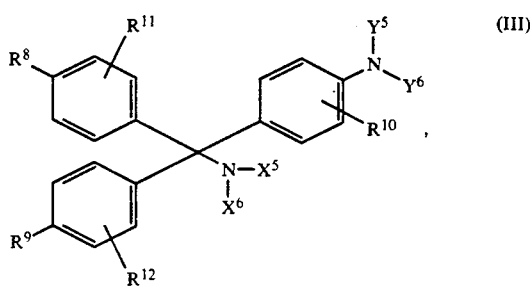

(III)

in which—independently of one another—

$R^8$ and $R^9$ are hydrogen, chlorine, $C_1-C_{12}$-alkyl, $C_1-C_{12}$-alkoxy, phenoxy or a radical of the formula

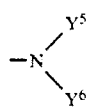

$R^{10}$, $R^{11}$, $R^{12}$ are hydrogen, chlorine, methyl, ethyl, propyl, butyl, methoxy, ethoxy, dimethylamino or diethylamino $Y^5$ and $Y^6$ are unsubstituted or chlorine-, cyano- or $C_1$–$C_4$-alkoxy-substituted $C_1$–$C_4$-alkyl, phenyl or benzyl is cyclohexyl, unsubstituted or chlorine-, methyl-, ethyl-, methoxy- or ethoxy-substituted phenyl, $C_1$–$C_4$-alkoxycarbonyl, unsubstituted or chlorine-, methyl-, ethyl-, methoxy- or ethoxysubstituted phenylcarbonyl, carbamoyl, N-$C_1$–$C_4$-alkylcarbamoyl, N,N-di-$C_1$–$C_4$-alkylcarbamoyl, unsubstituted or chlorine-, methyl-, ethyl-, methoxy- or ethoxy-substituted N-phenylcarbamoyl or N-$C_1$–$C_4$-alkyl-N-phenylcarbamoyl, $X^6$ is hydrogen, or $X^5$ with $X^6$ with the inclusion of the nitrogen atom carrying them can form a heterocyclic ring of the formulae

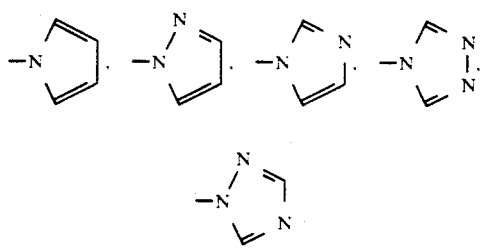

$R^8$ with $R^{11}$, $R^9$ with $R^{12}$ with the inclusion of the benzene ring carrying them can form a ring system of the formulae

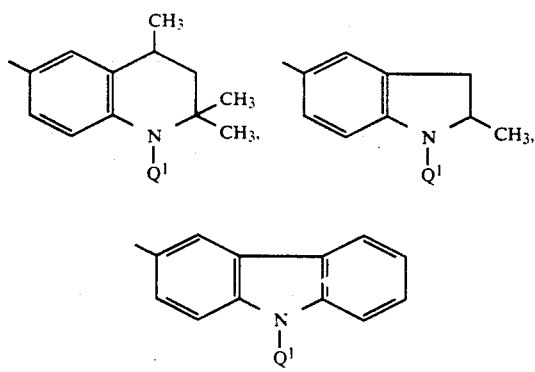

and $Q^1$ represents $C_1$–$C_{12}$-alkyl are particularly preferred.

The colour formers of the formula (I) can be prepared by processes known per se. One process comprises, for example, reacting the dyestuff salts of the formula

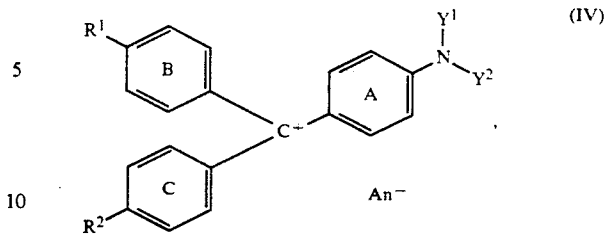

in which $R^1$, $R^2$, $Y^1$, $Y^2$ and the rings A, B and C have the above-mentioned meaning and An represents an anion from the series comprising chloride, bromide, acetate, sulphate, phosphate or p-toluenesulphonate, with the bases of the formula MeOH (V), in which Me is an alkali metal or alkaline earth metal, in particular sodium or potassium, in an organic solvent suitable for the reaction to give the carbinol bases of the formula

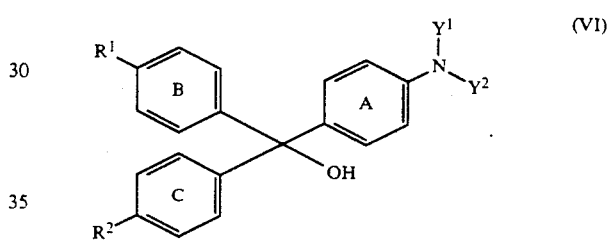

If appropriate, the organic phase is then separated off, and the carbinol bases of the formula (VI) are then condensed without isolating the intermediate with the compounds of the formula

in which $X^1$ and $X^2$ have the abovementioned meaning, while removing the water of reaction.

The compounds of the formula (I), if appropriate after the solvent has been removed, are then isolated.

Suitable reaction media are aromatic hydrocarbons, such as toluene, xylene, chlorobenzene, 1,2-dichlorobenzene or also chlorotoluenes and polar solvents, such as dimethylformamide, dimethyl sulphoxide, hexamethylphosphoric triamide and alkanols. Aromatic hydrocarbons and dimethylformamide are preferred.

Suitable reaction temperatures are between 20° and 120° C.; 30° to 80° C. are preferred.

A particularly advantageous preparation process comprises condensing in a 1-pot reaction ketones of the formula

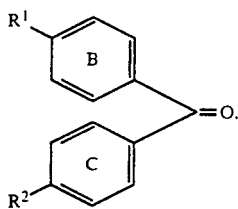

(VIII)

in which

R¹, R², B and C have the abovementioned meaning, with amines of the formula

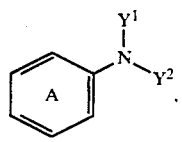

(IX)

in which

Y¹, Y² and A have the abovementioned meaning, or ketones of the formula

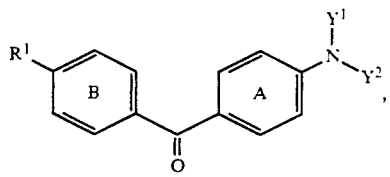

(X)

in which

R¹, Y¹, Y², A and B have the abovementioned meaning are condensed with compounds of the formula

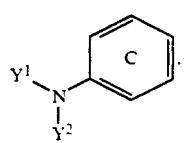

(XI)

in which

Y¹, Y² and C have the abovementioned meaning,
in the presence of a condensating agent supplying an anion An —, to give the colour salts of the formula (IV) and reacting these intermediates without isolating them successively with the bases (V) and the compounds (VII), as described above.

Phosphorus oxychloride and/or diphosphorus pentoxide are preferably used as condensating agents.

The compounds obtained of the formula (I) can be marketed without any further purification and used in pressure-sensitive recording materials, in particular in microencapsulated materials.

The colour formers according to the invention of the formula (I) are usually colourless or at most weakly coloured and have very high solubility in (chlorinated) hydrocarbons customary for encapsulation, phthalic esters or even in vegetable oils.

Upon contact with an acid developer, i.e. an electron acceptor, they produce deep blue, green-blue, green, violet or red shades which have excellent sublimation and light fastness. Mixing them with one another allows navy, grey or black colorations to be obtained.

They are also valuable in a mixture with one or more other known colour formers, for example 3,3-bis(aminophenyl)phthalides, 3,3-bis-(indolyl)phthalides, 3-aminofluoranes, 2,6-diaminofluoranes, leukoauramines, spiropyrans, spirodipyrans, chromenoindoles, phenoxazines, phenothiazines, carbazolylmethanes or other triarylmethane leuko dyestuffs, to give green, violet, blue, navy, grey or black colorations.

They show high colour intensity, excellent light fastness and excellent ageing and CB stability not only on phenolic substrates but also on salicylate and activated clays. They are suitable for pressure-sensitive recording materials, which can be both copying and recording materials. Their development rate differs as a function of the substituents. However, in general they are distinguished by a high development rate in combination with reduced sensitivity of the recording materials to unintended premature development.

The colour formers of the formula (I) furthermore show a particularly advantageous migration behaviour by virtue of their minimal diffusion through the capsule material of the microcapsules.

The solubility of the colour formers is increased by substitution with long-chain alkyl radicals to such an extent that it is possible to prepare highly concentrated solutions in the solvents suitable for microencapsulation even of the less soluble compounds.

Pressure-sensitive recording materials are disclosed, for example, in U.S. Pat. Nos. 2,800,457 and 2,800,458.

Colour formers of the formula I in which $Y^1$ is alkyl, aryl, cycloalkyl or aralkyl and
$Y^2$ is aryl and
$R^1$, $R^2$, $X^1$, $X^2$, A, B, and C have the abovementioned meaning,
are new and also provided by the present invention.

Of these compounds, the colour formers of the formula II in which $Y^3$ is unsubstituted or chlorine-, cyano-, $C_1-C_4$-alkoxycarbonyl- or $C_1-C_4$-alkoxy-substituted $C_1-C_{12}$-alkyl, cyclohexyl, phenyl or benzyl, which can be substituted by chlorine, $C_1-C_{12}$-alkyl or $C_1-C_{12}$-alkoxy, $Y^4$ is phenyl which is unsubstituted or substituted by chlorine, $C_1-C_{12}$-alkyl or $C_1-C_{12}$-alkoxy and the remaining radicals have the abovementioned meaning are preferred.

Of these compounds, the colour formers of the formula III in which $Y^5$ is unsubstituted or chlorine-, cyano- or $C_1-C_4$-alkoxy-substituted $C_1-C_4$-alkyl, phenyl or benzyl, $Y^6$ is phenyl which is unsubstituted or substituted by chlorine, cyano or $C_1-C_4$-alkoxy and the remaining radicals have the abovementioned meaning are particularly preferred.

EXAMPLE 1

14.2 g (0.1 mol) of phosphorus pentoxide are added in portions to a solution of 15.9 g (0.065 mol) of 4,4'-dimethoxybenzophenone, 98.5% pure, in 48.33 g (0.32 mol) of phosphorus oxychloride. Finally, 12 g (0.065 mol) of N-methyldiphenylamine are added dropwise to this mixture at room temperature over a period of 20 minutes. The mixture is heated to 50° C. and stirred at this temperature for 5 hours. The melt cooled to 20°-25° C. is poured slowly into 500 ml of water and 150 ml of toluene with thorough stirring at such a rate that the temperature does not exceed 40° C. The pH is adjusted to a value between 8.5 and 9 by slowly adding 240 g (1.8 mol) of 30% strength sodium hydroxide solution. The mixture is stirred at 40° C. for 4 hours. The organic phase which forms at the top is then separated off, and 4.4 g (0.065 mol) of imidazole and 5 drops of acetic acid are added. This solution is heated to reflux, and the water of reaction is removed azeotropically over a period of 20 hours by means of a water separator. Finally, the solvent is removed in a water pump vacuum of about 18-20 mbar and up to a temperature of 60° C. This gives 21.2 g (68.6% of theory) of pale pink crystals of melting point 158°-60° C. and of formula:

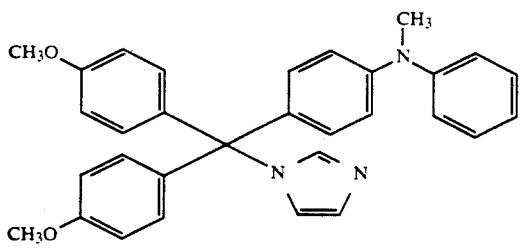

Reprecipitation from di-sec.-butyl ether gives 16 g of colourless crystals of melting point 164°-67° C. $C_{31}H_{29}N_3O_2$ (475.6)

|  | % C | % H | % N |
|---|---|---|---|
| Calculated: | 78.3 | 6.15 | 8.83 |
| Found: | 78.0 | 6.4 | 8.8 |

A solution in glacial acetic acid turns red-violet at a $\lambda_{max}$ of 556 nm and $\lambda_2$ of 430 nm. The substance can be readily dissolved, even at relatively high concentration, in diisopropylnaphthalene, chloroparaffin ($C_{12}$-$C_{18}$-n-paraffin containing about 45% of chlorine), sesame oil or linseed oil.

Strong red-violet shades having high CF and CB light features and little discolouring of the base paper are obtained on acid clay, bisphenol A and salicylate.

The colour former furthermore, when incorporated in microcapsules whose shells are made of polyaddition products of polyisocyanates and polyamines, shows no significant migration at elevated temperatures, which is particularly advantageous.

The procedure of the above example is repeated, except that after the reaction to form the carbinol base the corresponding nucleophilic compounds of the formula (VII) are added instead of imidazole, and the workup is carried out as described, to give the following colour formers in yields between 70 and 85% of theory, all of which show only little discolouring of the base paper and have good migration behaviour.

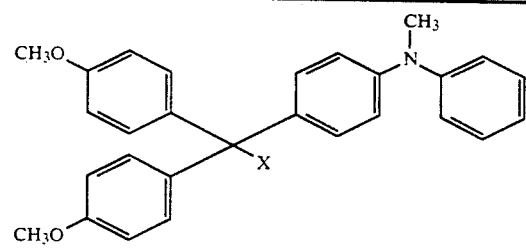

| Example | X | M.p. (°C.) (reprec. from) | Analytical data |
|---|---|---|---|
| 2 | -N⟨N=CH-N=⟩ (triazole) | 125-130 (Methylcyclohexane) | $C_{30}H_{28}N_4O_2$ (476, 6)<br>Calc.: 75.6% C, 5.92% H, 11.76% N<br>found: 75.4% C, 6.0% H, 11.5% N |
| 3 | -N⟨N-CH=CH-CH=⟩ (pyrazole) | 25-30 (Resin) | $C_{31}H_{29}N_3O_2$ (475, 6)<br>MS: m/e = 475 (25%) M$^+$ |
| 4 | -HN-C₆H₅ | 185-186 (Methanol) | $C_{34}H_{32}N_2O_2$ (500, 6)<br>Calc.: 81.57% C, 6.44% H, 5.60% N<br>found: 80.9% C, 6.6% H, 5.4% N |
| 5 | -HN-C₆H₄-OCH₃ | 66-68 (Isopropanol) | $C_{35}H_{34}N_2O_3$ (530, 6)<br>Calc.: 79.2% C, 6.46% H, 5.28% N<br>found: 78.6% C, 6.5% H, 5.1% N |
| 6 | -HN-C₆H₁₁ (cyclohexyl) | (Resin) | $C_{34}H_{38}N_2O_2$ (506, 7)<br>MS: m/e = 506 (28%) M$^+$<br>475 (3.6%) M$^+$—OCH$_3$<br>408 (100%) M$^+$—NH—C$_6$H$_{11}$ |

-continued

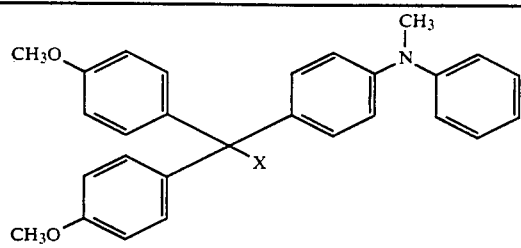

| Example | X | M.p. (°C.) (reprec. from) | Analytical data |
|---|---|---|---|
| 7 | —N(piperidine) | 42–47 | $C_{33}H_{36}N_2O_2$ (492, 6)<br>MS: m/e = 492 (2%) $M^+$<br>461 (8.6%) $M^+$—$OCH_3$<br>408 (100%) $M^+$—N(piperidine) |
| 8 | —N(CH₃)(Ph) | (Resin) | $C_{35}H_{34}N_2O_2$ (514, 7)<br>MS: m/e = 514 (2%) $M^+$<br>484 (16%) $M^+$—$2CH_3$<br>468 (23%) $M^+$—$OCH_3$—$CH_3$<br>408 (100%) $M^+$—N(Ph)(CH₃) |
| 9 | —NH—C(O)—NH₂ | 65–67 (Methylcyclohexane) | $C_{29}H_{29}N_3O_3$ (467, 6)<br>MS: m/e = 467 (3%) $M^+$<br>450 (34%) $M^+$—$NH_3$<br>408 (100%) $M^+$—HN—C(O)—NH₂ |
| 10 | —NH—C(O)—NH—CH₃ | 176–178 (Toluene) | $C_{30}H_{31}N_3O_3$ (481, 6)<br>MS: m/e = 481 (11.3%) $M^+$<br>450 (3.6%) $M^+$—$OCH_3$<br>408 (100%) $M^+$—HN—C(O)—NH—CH₃ |
| 11 | —NH—C(O)—NH—Ph | 79–83 | $C_{35}H_{33}N_3O_3$ (543, 7)<br>MS: m/e = 543 (15.6%) $M^+$<br>512 (9.6%) $M^+$—$OCH_3$<br>408 (100%) $M^+$—HN—C(O)—NH—Ph |
| 12 | —HN—C(O)—OCH₃ | Resin | $C_{30}H_{30}N_2O_4$ (482, 6)<br>MS: m/e = 482 (5.3%) $M^+$<br>451 (23%) $M^+$—$OCH_3$<br>408 (100%) $M^+$—HN—C(O)—OCH₃ |
| 13 | —HN—C(O)—Ph | Resin | $C_{35}H_{32}N_2O_3$ (528, 6)<br>MS: m/e = 528 (30%) $M^+$<br>497 (7.3%) $M^+$—$OCH_3$<br>408 (100%) $M^+$—HN—C(O)—Ph |

EXAMPLE 14

17.3 g (0.05 mol) of malachite green base, 3.4 g (0.05 mol) of imidazole and a few drops of acetic acid are refluxed in 200 ml of toluene in a water separator for 20 hours. The solvent is then removed in a water pump vacuum. The residue is refluxed with 100 ml of diisopropyl ether for a short time and cooled. The product is filtered off with suction and dried at 30° C. in vacuo to give 50.4 g (77.7% of theory) of a light grey crystalline powder of melting point 159°–65° C. and of the formula

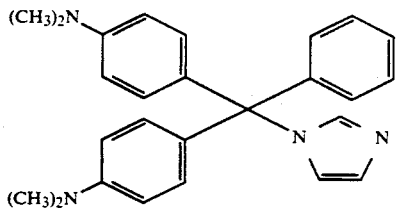

14

Reprecipitation from di-sec.-butyl ether gives almost colourless crystals of melting point 168°–71° C. $C_{26}H_{28}N_4$ (396.5)

|  | % C | % H | % N |
|---|---|---|---|
| Calculated: | 78.75 | 7.12 | 14.13 |
| Found: | 78.6 | 7.1 | 13.6 |

A strong green colour which shows only little discolouring of the base paper is obtained on acid clay.

EXAMPLE 15

The colour former of the formula

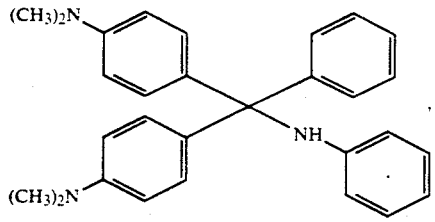

15 is obtained in the same manner as described in the above example by using the corresponding amount of aniline instead of imidazole. Melting point: 176°–78° C. (from methylcyclohexane).

|  | % C | % H | % N |
|---|---|---|---|
| Calculated: | 82.62 | 7.41 | 9.97 |
| Found: | 82.5 | 7.2 | 9.8 |

EXAMPLE 16

16 g (0.04 mol) of crystal violet carbinol base, 4.85 g (0.04 mol) of benzamide and 3 drops of acetic acid are refluxed in 150 ml of toluene for 18 hours in a water separator. The solvent is then removed in a water pump vacuum, and the remaining resin-like residue is boiled in 250 ml of di-sec.-butyl ether for a short time. After cooling to room temperature, the product is filtered off with suction and dried to give 13.4 g (68% of theory) of grey crystals of melting point 148°–151° C. and the formula

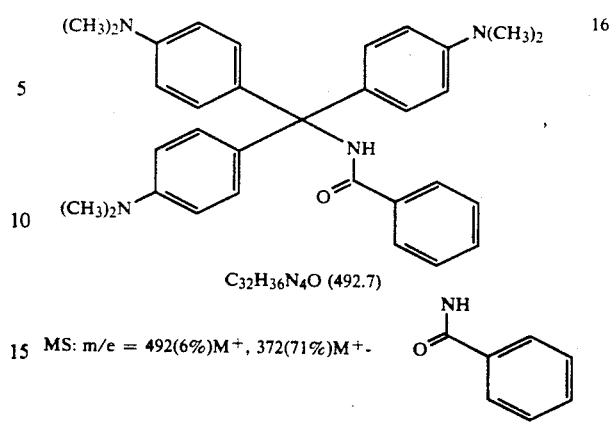

$C_{32}H_{36}N_4O$ (492.7)

MS: m/e = 492(6%)M+, 372(71%)M+.

Strong blue shades are obtained on acid clay and bisphenol A.

EXAMPLE 17

27.9 g (0.13 mol) of 1-ethyl-2,2,4-trimethyl-1,2,3,4-tetrahydroquinoline are slowly added dropwise at room temperature to a suspension of 23.7 g (0.13 mol) of benzophenone and 36 g (0.25 mol) of phosphorus pentoxide, 98.5% pure, in 96.9 g (0.63 mol) of phosphorus oxychloride. The reaction mixture is heated to 90° C. and stirred at this temperature for 20 hours. The cooled melt is poured into 700 ml of ice water, stirred for 30 minutes, and 200 ml of toluene are added. At 40° C., 480 g (3.6 mol) of 30% strength sodium hydroxide solution are added dropwise over a period of 1 hour. Stirring at 40° C. is continued for 10 hours, and the organic phase is separated off. 12.1 g (0.13 mol) of aniline and 3 drops of acetic acid are added to the solution, and the resulting water of reaction is removed, while refluxing the mixture for 18 hours in a water separator. The solvent is then removed, the remaining residue is stirred in 100 ml of methanol for a short time and dried. Yield: 45.3 g (75.6% of theory) of grey crystals of melting point 162°–66° C. and of the formula:

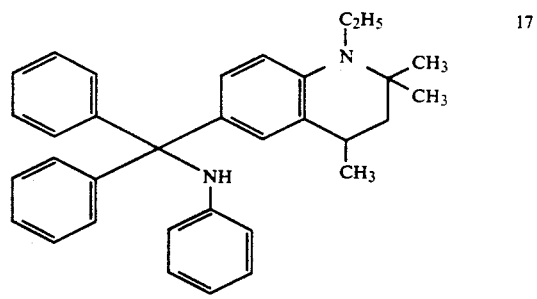

A solution in glacial acetic acid turns orange at a $\lambda_{max}$ of 468 nm and $\lambda_2$ of 340 nm. Strong orange shades having very good fastness properties are obtained on acid clay, salicylate and bisphenol A.

EXAMPLE 18

30.8 g (0.1 mol) of 4-(N-methylphenyl)benzophenone, 89.6% pure, and 19 g (0.14 mol) of phosphorus pentoxide are suspended in 74.3 g (0.48 mol) of phosphorus oxychloride, and 18.5 g (0.1 mol) of N-methyldiphenylamine are added slowly at room temperature. The reaction mixture is stirred at 50° C. for 15 hours and, after cooling, poured into 500 ml of ice water at such a rate that the temperature does not exceed 15° C. 200 ml of toluene are added, and 335 g (2.5 mol) of 30% strength sodium hydroxide solution are added dropwise to the mixture over a period of 1 hour. The mixture is stirred at 50° C. for 2 hours. The organic phase is separated off, and 12.1 g (0.1 mol) of 4-ethylaniline and 3 drops of acetic acid are added. The mixture is heated to reflux, and the water of reaction is removed azeotropically in a water separator over a period of 18 hours. After the reaction is complete, the solvent is removed in a water pump vacuum. 200 ml of isopropanol are added to the residue, and the mixture is boiled for a short time. The product is filtered off and dried at 30° C. in vacuo to give 42.5 g (74% of theory) of a light beige crystalline powder of melting point 48°–53° C. and of the formula:

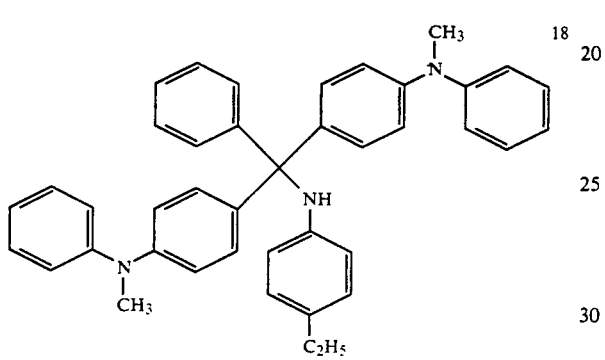

A solution in glacial acetic acid shows a strong green colour at a $\lambda_{max}$ of 626 nm and $\lambda_2$ of 423 nm.

EXAMPLE 19

22.34 g (0.07 mol) of 9-ethyl-3-benzoylcarbazole, 93.8% pure, and 14.4 g (0.1 mol) of phosphorus pentoxide, 98% pure, are suspended in 52.6 g (0.34 mol) of phosphorus oxychloride, and 12.9 g (0.07 mol) of N-methyldiphenylamine are added slowly. The reaction mixture is stirred at 50° C. for 12 hours and, after cooling, poured into 200 ml of ice water at such a rate that the temperature does not exceed 50° C. 150 ml of toluene are added, and 200 ml 50% strength sodium hydroxide solution are added dropwise over a period of 1 hour. The mixture is stirred at 50° C. for 6 hours. The organic phase is separated off, 4.83 g (0.07 mol) of 1,2,4-triazole and 5 drops of acetic acid are added. This solution is heated to reflux, and the water formed is removed azeotropically in a water separator over a period of 18 hours. Finally, the solvent is removed in a water pump vacuum. The residue is dried to give 25.5 g (68.3% of theory) of slightly yellowish crystals of melting point 69°–74° C. and of the formula:

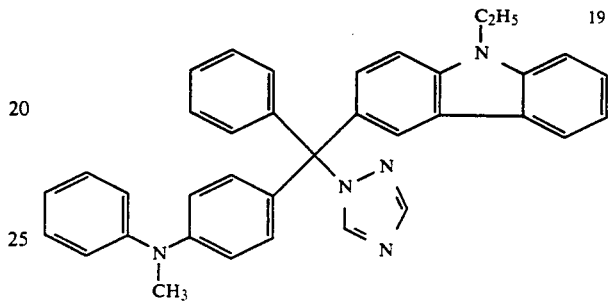

Reprecipitation from methylcyclohexane gives light yellow crystals of melting point 79°–81° C.

A solution in glacial acetic acid turns green at a $\lambda_{max}$ of 610 nm and $\lambda_2$ of 428 nm.

MS: m/e = 533(20.5%)M$^+$, 405(100%)M$^+$-  

Analogously to Examples 14 to 19, the following colour formers are also prepared:

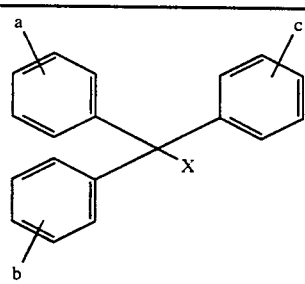

| Ex. | a | b | c | X | Shade on acid clay or bisphenol A |
|---|---|---|---|---|---|
| 20 | 4-OCH$_3$<br>2-OCH$_3$ | 4-OCH$_3$ | 4-N(CH$_3$)(C$_6$H$_5$) | 4-NH-C$_6$H$_4$-Cl | red-violet |
| 21 | 4-OCH$_3$<br>2-OCH$_3$ | 3-OCH$_3$ | 4-N(C$_2$H$_5$)(3-C$_6$H$_4$-) | N(CH$_3$)C(O)OC$_2$H$_5$ | blue-violet |

-continued

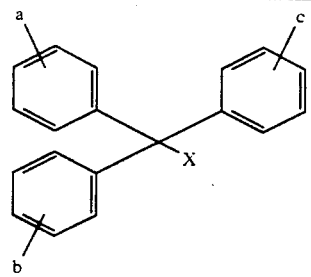

| Ex. | a | b | c | X | Shade on acid clay or bisphenol A |
|---|---|---|---|---|---|
| 22 | 4-OC$_4$H$_9$ | 4-OCH$_3$<br>3-C$_3$H$_7$-i<br>5-C$_3$H$_7$-i | 4-N(C$_4$H$_9$)(C$_6$H$_5$) | -NH-C(=O)-C$_6$H$_4$-4-OCH$_3$ (N-methyl) | dark violet |
| 23 | 4-OC$_6$H$_5$ | 4-N(C$_2$H$_5$)(C$_2$H$_4$Cl) | 4-N(C$_2$H$_5$)(C$_6$H$_5$) | -NH-C(=O)-N(CH$_3$)(C$_6$H$_5$) | green |
| 24 | 2-Cl | 4-N(C$_2$H$_5$)$_2$ | 4-N(C$_2$H$_5$)$_2$<br>2-OC$_2$H$_5$ | -NH-C(=O)-NH$_2$ (N-methyl) | blue-green |
| 25 | 4-N(C$_2$H$_5$)(CH$_2$C$_6$H$_5$) | 4-N(C$_2$H$_5$)(CH$_2$C$_6$H$_5$) | 4-OC$_4$H$_9$<br>2-C$_4$H$_9$ | pyrrol-1-yl | dark green |
| 26 | H | 4-N(C$_2$H$_5$)(C$_6$H$_4$-3) | 4-N(C$_2$H$_5$)(C$_6$H$_4$-3) | pyrazol-1-yl | blue-green |
| 27 | 2-Cl | 4-N(C$_2$H$_5$)$_2$ | 4-N(C$_2$H$_5$)(C$_6$H$_4$-3) | 1,2,4-triazol-1-yl | blue |
| 28 | 4-Cl<br>2-CH$_3$ | 4-N(C$_4$H$_9$)$_2$<br>2-OCH$_3$ | 4-N(C$_2$H$_5$)(CH$_2$CH(CH$_3$)$_2$) | -NH-C(=O)-C$_6$H$_4$-4-Cl (N-methyl) | dull green |
| 29 | H | 4-N(CH$_3$)$_2$<br>2-N(CH$_3$)$_2$ | 4-N(C$_2$H$_5$)(CH(CH$_3$)-C$_6$H$_4$-3) | -NH-cyclohexyl (N-methyl) | green |
| 30 | 4-OC$_2$H$_5$ | 4-N(C$_2$H$_5$)(CH$_2$C(CH$_3$)$_2$CH(CH$_3$)-3) | 4-N(C$_3$H$_7$)(C$_6$H$_5$) | -N(CH$_3$)-C(=O)-N(CH$_3$)(CH$_3$) | dark green |

-continued

| Ex. | a | b | c | X | Shade on acid clay or bisphenol A |
|---|---|---|---|---|---|
| 31 | 4-N(C$_2$H$_5$)$_2$ | 4-N(C$_2$H$_5$)$_2$ | 4-N(C$_2$H$_5$)$_2$ | (1,2,4-triazol-1-yl) | blue |
| 32 | 4-C$_{12}$H$_{25}$ 2-CH$_3$ | 4-N(C$_2$H$_5$)(CH$_2$CH$_3$-...) (phenyl) | 4-N(CH$_3$)$_2$ 3-CH$_3$ 5-CH$_3$ | -N(CH$_3$)-C(=O)-OC$_4$H$_9$ | dull green |

EXAMPLE 33

5 g of the colour former of Example 1 are dissolved in a mixture of 60 g of dodecylbenzene and 40 g of chloroparaffin having a Cl content of 45%. 223 g of such a solution are mixed with 39.5 g of the oxadiazinetrione of Desmodur H (NCO content 20.5%). It is then mixed with 320 g of 0.5% strength polyvinyl alcohol solution and emulsified in the shear gradient of a rotor/stator emulsifier. The crosslinking is carried out with 76 g of 9.0% strength diethylenetriamine solution. The aftertreatment is carried out by heating the dispersion to 60° C. and stirring it at 60° C. for 3 hours. This gives a dispersion containing 40% of capsules of the capsule size 7.3 μm.

250 ml of this dispersion are initially introduced, and 40 g of finely ground cellulose (Arbocell BE 600/30 from Rettenmeier & Söhne) are slowly added with vigorous stirring. After vigorous stirring for at least 30 minutes, 40 ml of 50% strength SBR latex (Baystal P 1600 from Bayer AG) are added. The resulting 48.5% strength brushing paint is diluted with water to a solids content of 30% and applied to the back of a commercial base paper by means of an air brush. The coating thickness after drying is 5 g/m². The paper brush-coated in this manner is placed with the coated side on the side of a commercially known carbon-free copying paper which is coated with a developer substance. When a pressure is applied by writing on the paper coated with capsules, a red-violet copy which has very good light fastness is produced on the copy paper.

EXAMPLE 34

The procedure analogously to Example 33 is repeated, using 5 g of the colour former of Example 7, to give a paper coated with microcapsules, which in an analogous manner gives a strong green copy which likewise has very good light fastness.

We claim:
1. Color formers of the formula

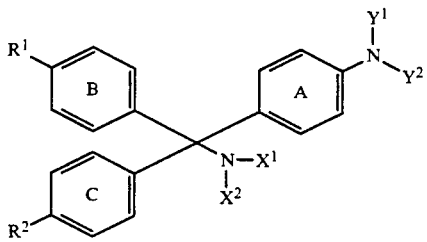

in which
R$^1$ and R$^2$ represent hydrogen, halogen, alkyl, alkyl substituted by chlorine or C$_{1-4}$-alkoxy, aralkyl, alkoxy, alkoxy substituted by chlorine or C$_{1-4}$-alkoxy, aralkoxy, aryloxy or a radical of the formula

Y$^1$ and Y$^2$ are alkyl, alkyl substituted by chlorine, cyano, C$_{1-4}$-alkoxycarbonyl or C$_{1-4}$-alkoxy, aryl, aryl substituted by chlorine, C$_{1-12}$-alkyl, or C$_{1-12}$-alkoxy, cycloalkyl, aralkyl or aralkyl substituted by chlorine, C$_{1-12}$-alkyl, or C$_{1-12}$-alkoxy, with the proviso that at least one of Y$^1$ and Y$^2$ is other than alkyl; and X$^1$ and X$^2$ together with the nitrogen atom to which they are attached form an imidazol-1-yl or a 1,2,4-triazol-1-yl group;

the rings A, B, and C being either isolated or part of a ring system having one of the formulae

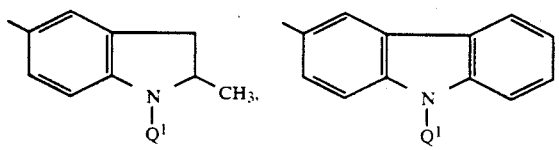

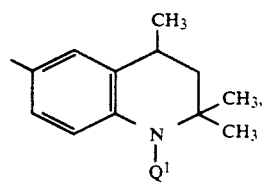

wherein

Q¹ represents $C_{1-12}$-alkyl; and the rings A, B, and C being either further unsubstituted or further substituted by one or more substituents selected from the group consisting of chlorine, $C_{1-12}$-alkyl, $C_{1-12}$-alkoxy, phenoxy, benzyloxy, or a radical of the formula

wherein

Y³ and Y⁴ are $C_{1-12}$-alkyl which is unsubstituted or substituted by chlorine, cyano, $C_{1-4}$-alkoxycarbonyl or $C_{1-4}$-alkoxy, cyclohexyl, phenyl or benzyl, which can be substituted by chlorine, $C_{1-12}$-alkyl or $C_{1-12}$-alkoxy.

2. Color formers of the formula

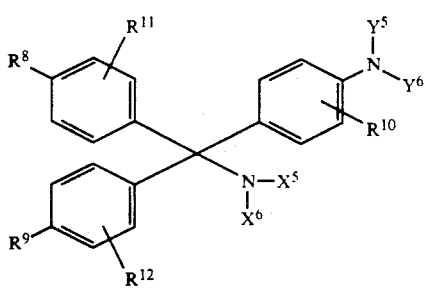

in which

R⁸ and R⁹ independently represent hydrogen, chlorine, $C_{1-12}$-alkyl, $C_{1-12}$-alkoxy, phenoxy or a radical of the formula

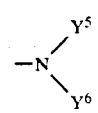

$R^{10}$, $R^{11}$, and $R^{12}$ independently represent hydrogen, chlorine, methyl, ethyl, propyl, butyl, methoxy, ethoxy, dimethylamino or diethylamino;

R⁸ with R¹¹, R⁹ with R¹² with the inclusion of the benzene ring carrying them can form a ring system of the formulae

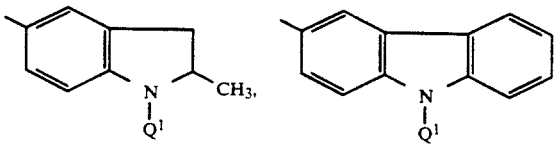

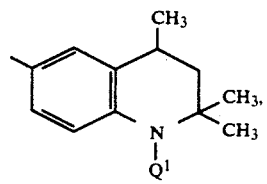

wherein

Q¹ represents $C_{1-12}$-alkyl;

Y⁵ and Y⁶ are unsubstituted or chlorine-, cyano-, or $C_{1-4}$-alkoxy-substituted $C_{1-4}$-alkyl, phenyl or benzyl, with the proviso that at least one of Y⁵ and Y⁶ is other than unsubstituted alkyl; and X⁵ and X⁶ together with the nitrogen atoms to which they are attached form an imidazol-1-yl or a 1,2,4-triazol-1-yl group.

3. Compounds according to claim 1, in which
Y¹ is alkyl, aryl, cycloalkyl or aralkyl,
Y² is aryl and
R¹, R², X¹, X², A, B, and C have the meaning mentioned in claim 1.

4. Compound of the formula:

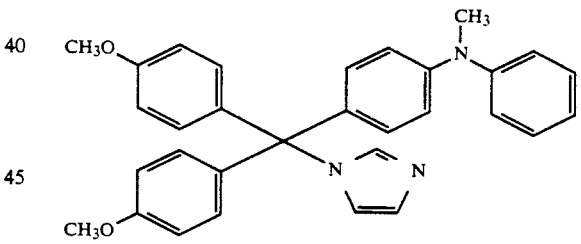

5. Compound of the formula:

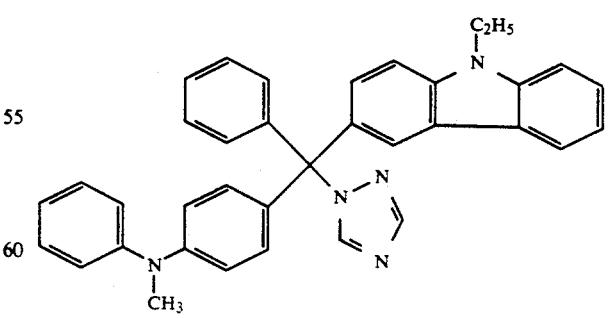

* * * * *